April 25, 1950     E. F. WEISER     2,505,597
TEMPERATURE REGULATING SYSTEM
Filed Oct. 22, 1947
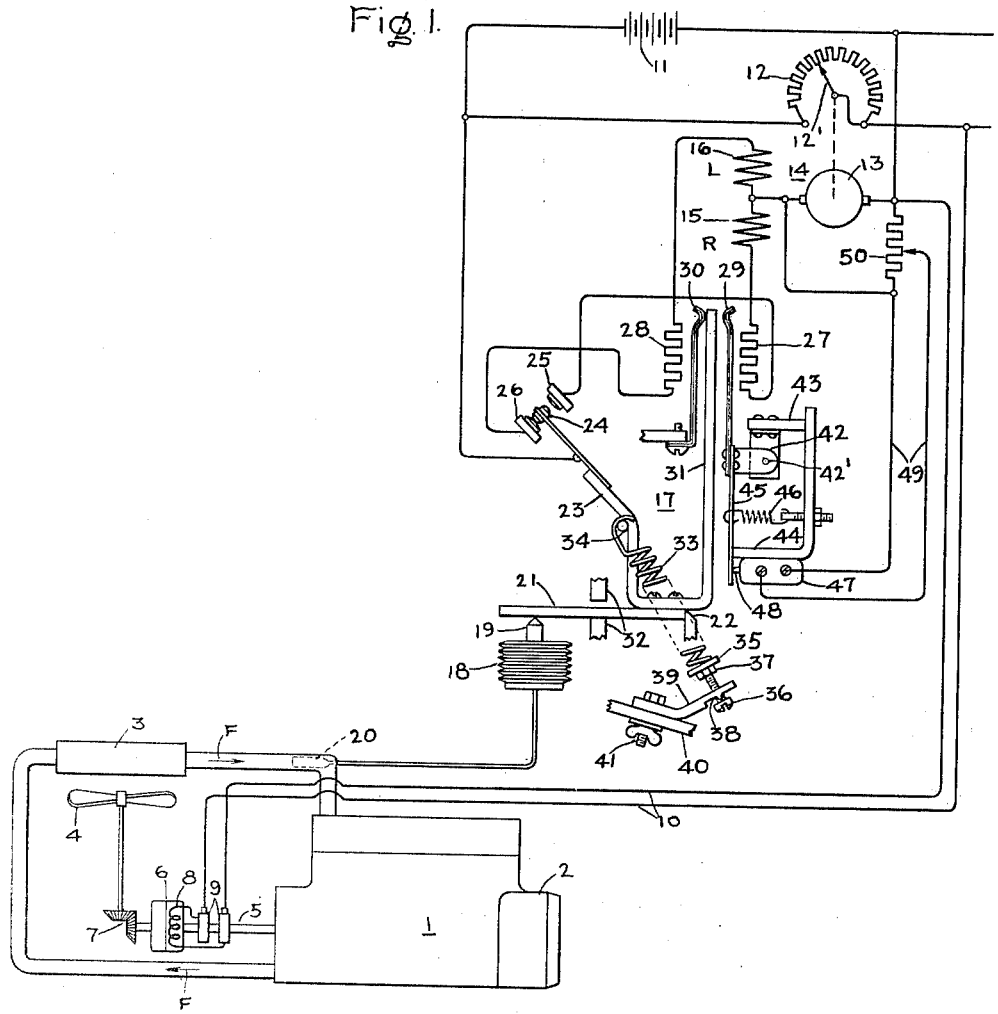
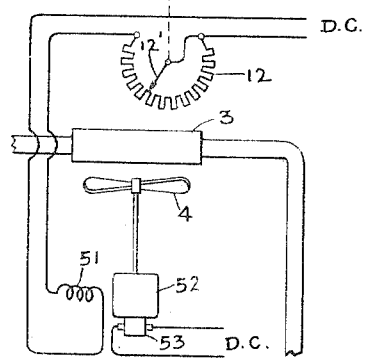
Inventor:
Earnest F. Weiser,
by His Attorney.

Patented Apr. 25, 1950

2,505,597

UNITED STATES PATENT OFFICE 2,505,597

TEMPERATURE REGULATING SYSTEM

Earnest F. Weiser, Erie, Pa., assignor to General Electric Company, a corporation of New York Application October 22, 1947, Serial No. 781,322

4 Claims. (Cl. 236—35)

My invention relates to a temperature regulating system, and more particularly to a system for regulating the temperature of the cooling medium for prime mover power plants, such as the internal combustion engine.

The internal combustion engine in general, and particularly the Diesel engine, operates most efficiently and gives best all-around service when the engine temperature is maintained relatively constant at the optimum temperature level. The recent widespread use of Diesel engines in railway and locomotive applications involves the operation of the Diesel engine throughout a wide range of outdoor or ambient temperatures such as encountered in altitude changes and changing weather conditions along the line of the locomotive's travel. Engine temperature variations are also aggravated by the wide variations in load placed upon the engine due to periods of acceleration, coasting and track gradients of varying degrees of severity. It is, therefore, desirable to provide completely automatic temperature regulating means which will insure that engine temperature is maintained relatively constant within close limits, and which will provide a stabilized system wherein temperature variations of the cooling medium, either due to internal or ambient causes, are avoided.

Accordingly, it is an object of my invention to provide an improved automatic temperature regulating system.

It is another object of my invention to provide a relatively simple and improved cooling water temperature control system for internal combustion engines which is entirely automatic in its operation.

It is still another objection of my invention to provided an improved temperature regulator with stabilizing or anti-hunt features which will operate to maintain the temperature to be controlled at a desired value and without hunting or oscillation about that value.

In accordance with my invention, I have provided a more or less conventional cooling system for an internal combustion engine, which includes a cooling radiator or heat exchanger exposed to the outside atmosphere and which is provided with an engine driven fan or blower for varying the rate of heat transfer taking place in the radiator. The fan speed is varied in response to the outlet water temperature of the radiator by means of an electromagnetic clutch interposed between the drive shaft of the engine and the fan. By thus varying the energization of the clutch, the amount of torque transmitted to the fan can be adjusted and the fan speed varied throughout a wide range to thereby hold the outlet water temperature of the radiator constant. A temperature-sensitive device associated with the outlet passage of the radiator is operative to adjust a variable resistance in series with the energizing coil of the magnetic clutch. Anti-hunt means to prevent overshooting of the water temperature adjustment function are provided in the form of a pair of oppositely acting bimetallic elements and a pair of heaters associated therewith, one of which heaters is energized during the resistance changing operation causing its respective bimetallic element to exert a biasing force on the temperature-sensitive device, thereby tending to counteract the temperature change initiating action of the temperature-sensitive device before too great an adjustment has been made. By this means the changes in water temperature are accomplished incrementally, and the water temperature approaches the desired value gradually, instead of the usual overshooting and resulting oscillation of temperature about the required value.

For a more complete understanding of my invention, reference should now be had to the accompanying drawing and the detailed specification, and the features of novelty which characterize my invention will be pointed out with particularity in the claims annexed to and forming a part of this specification.

In the drawing, Fig. 1 is a diagrammatic representation of my complete temperature control system for an internal combustion engine such as a Diesel engine as applied in a locomotive power plant, and Fig. 2 is a modification of the engine temperature control system shown in Fig. 1.

Referring to the drawing, I have shown an internal combustion engine 1 connected to drive a main generator 2 for supplying electrical energy to drive a self-propelled vehicle. The engine 1 is cooled by a fluid medium, such as water, which is circulated from the engine, through the cooling radiator 3, and back to the engine, as shown by the directional arrows F in Fig. 1. The radiator 3 is exposed to the outside atmosphere and the required flow of air through the radiator is supplied by the fan 4, which is driven from the main drive shaft of the engine 5 through the electromagnetic clutch 6 and gearing 7. The clutch 6, which may be of any desired construction, is schematically shown and includes an exciting or magnetizing coil 8 which is supplied with direct current by means of the slip rings 9 and the conductors 10.

Exciting current for the coil 8 is supplied from the battery 11, and in series with one of the supply conductors is the variable resistance or motor driven rheostat 12 in which the contact arm 12' of the rheostat is mechanically operated by means of the armature 13 of the split field direct current motor 14. The motor 14 incorporates a forward winding 15 and a reverse winding 16, but for purposes of convenience in referring to the operation of the system, the windings will be termed "raise" and "lower." The "raise" winding 15 produces rotation of the armature in a direction to decrease resistance in the clutch circuit, thereby increasing the torque transmitted by the clutch and raising the speed of the cooling fan 4. The field winding 16 produces opposite rotation of the armature, inserting resistance into the clutch circuit, and thereby lowering the speed of the cooling fan 4.

The temperature-sensitive device, shown generally at 17, comprises a temperature responsive bellows 18 having a movable operating member 19 and being provided with a bulb 20 which is positioned in the cooling water outlet passage from the radiator 3. The bulb and bellows system is filled with a volatile substance so that on increase of water temperature the bulb 20 produces expansion of the bellows 18, moving the operating point 19 upwardly and rotating the main switch operating lever 21 in a clockwise direction. The L-shaped lever 21 is pivoted at 22 and carries on its intermediate arm 23 a movable circuit closing contact 24 which is arranged to engage the fixed contact 25 in one position and the fixed contact 26 in its opposite position. When the movable contact 24 engages contact 25, a circuit is completed from the battery 11, through the motor armature 13, field winding 15 of the rheostat drive motor, and the heater element 27, all of which are in series with the fixed contact 25. Movement of the contact 24 to the left engages the opposed fixed contact 26 and completes the circuit from the battery 11, through the motor armature 13, the field winding 16 and the oppositely disposed heater element 28, all of which are in series circuit relationship with the contact 26.

To prevent hunting or over-adjustment of the rheostat 12, the upper lever arm 31 of the operating lever 21 is disposed for engagement, alternately, by a pair of bimetallic strip elements 29 and 30, respectively, which elements are arranged so that the application of heat by the heater 27 to the right bimetallic element 29 will cause it to flex to the left, exerting a downward force on the lever 21, and the application of heat by the heater 28 will cause the reverse of this action to take place, namely, an upward force on the end of the lever 21. It will be noted that the operating lever 21 is allowed to move through a limited range as determined by the stops 32.

By means of the tension spring 33, a positive downward force is applied at all times to the lever 21 biasing it in a counterclockwise direction, or, as viewed in Fig. 1, biasing it to the position shown wherein the lever 21 is in engagement with the stops 32. Thus the pressure developed in the bulb 20, which is effective to actuate the bellows 18 and its operating pin 19, is opposed by the force of the biasing spring 33. The bellows 18 has an inherent spring force, tending to oppose with increasing force the fluid pressure as the bellows expands, and in order to make the temperature responsive device as sensitive as possible, it is desirable to cancel, insofar as possible, this inherent increasing force by means of the orientation of the biasing spring 33. Thus the biasing spring is located at an angle to the dead-center position of the lever pivot 22 and offset therefrom, so that the lever arm through which the spring 33 acts decreases, consequently decreasing the biasing force on the lever 21, as the lever moves in the clockwise direction around its fixed pivot 22. The biasing spring 33 thereby provides a force having a decreasing opposition to bellows movement at all times, since the movement of the lever 21, as permitted by the stops 32, is not sufficient to allow the spring to reach the full dead-center position.

As shown in Fig. 1, the biasing spring 33 is secured to the switch arm 23 by means of a pin 34. Provision is made at the opposite or lower end of the biasing spring 33 for adjustment of the tension of the spring and also adjustment of the effective radius of action of the spring, so that the relative sensitivity of the device to changes in water temperature may be increased or decreased as desired. At the lower end the spring 33 is secured to the collar 35, into which is threaded the adjusting bolt 36. A lock nut 37 is utilized and the cap head of the bolt 36 engages with knife-edge 38 formed in the support 39. By means of the assembly just described, the absolute tension on the spring may be adjusted to the desired value and locked in the adjusted position. For changing the angle of the spring relative to the lever support 22, the member 39 is provided with a slot so that it may be moved lengthwise relative to the fixed member 40 which may form a portion of the frame or mounting support for the device 17. A wing nut and bolt assembly 41 is provided to lock the adjustment in the desired position after the effective radius of action of the spring 33 has been properly determined and set.

The construction of the thermal responsive device as just described provides a system in which the movement of the main operating lever 21 is substantially independent of any extraneous forces, such as the inherent spring force of the bellows and ambient temperature changes, since the decreasing effective force with bellows expansion of the biasing spring effectively cancels the inherent increasing spring force with expansion of the bellows. By this means, the movement of the lever 21 may be made extremely sensitive to and substantially directly proportional to the pressure developed in the bellows system which, in turn, is substantially proportional to the temperature of the engine cooling water as it leaves the radiator 3.

The heater elements and their associated bimetallic biasing springs operate to anticipate, in a sense, the final positioning of the main operating lever since, by referring to Fig. 1, it will be noted that with the lever 21 in the position shown, which corresponds to a condition of water temperature lower than normal, the bellows 18 are substantially collapsed and the circuit is closed by the contact member 26, thereby energizing the "lower" field winding 16 and the heater element 28. The motor drives the rheostat 12 through a reduction gear train (not shown) rapidly, relative to system response, to increase the amount of resistance in the magnetic clutch exciting circuit, thereby reducing the torque transmitted by the clutch and allowing the speed of the radiator fan to decrease. At the same time that the fan speed is being decreased with a consequent increase of water temperature at the outlet of the radiator, the heater element 28 is energized applying heat to the bimetal strip 30 which, after a predetermined time interval, will exert sufficient upward biasing force on the lever 21 to rotate it to a position whereby the circuit through the contact member 26 is interrupted. This time interval increases as temperature deviates more widely from preset temperature and wipes contacts more strongly, requiring more bimetal force and consequently more heat and longer motor running time to effect contact separation. The amount of correction supplied to the fan is, therefore, greater for greater temperature divergence, resulting in correcting from the deviated temperature more rapidly. The interruption of the circuit through the heater 28 and through the driving motor allows the rheostat to remain in the last position attained and also, by anticipating the bellows movement, prevents the fan speed from being decreased to such an extent that the water temperature will attain an excessive value. Thus, the overshooting of the final desired position is avoided and if the heater element 28 and its associated bimetal strip 30 have operated too soon, that is prior to the time that the water temperature reaches the desired value, upon deenergization of the heater 28 the bimetal will cool and allow the lever to rotate slightly counterclockwise, thereby reclosing the energizing circuit to the heater 28 and rheostat drive motor and allowing an additional adjustment in the proper direction to bring the water temperature to the desired value. This adjustment process will be automatically continued until the water temperature has fallen within the predetermined limits which are preset by the operator, the width of the regulating range being established by the sensitivity of the thermal responsive device 17.

In the converse situation when, due to increased loading of the engine or higher ambient temperature, the outlet water temperature of the radiator becomes excessive, the bellows 18 will expand, rotating the lever arm 21 in a clockwise direction and closing the contacts 25 thereby energizing the "raise" field winding 15 of the rheostat drive motor to cause the motor to operate in a direction to reduce the amount of resistance in the magnetic clutch energizing circuit. This will increase the torque transmitted by the clutch, resulting in an increase in fan speed and consequent cooling function performed by the radiator. As in the case previously described, the energization of the field winding 15 also energizes the heater element 27 which is effective to transmit heat to the bimetallic strip 29 which after a predetermined time interval, will exert sufficient downward biasing force on the operating lever 21 to overcome the force of the bellows and will eventually open the contacts 25, interrupting the rheostat drive motor circuit and stopping the motor driven rheostat 12 at its last position. If it develops that the initial adjustment made by the drive motor rheostat was not sufficient to reduce the water temperature to the required level, upon cooling of the heater 27 the pressure in the bellows as caused by the excessive water temperature will again operate to close the contacts 25, energizing the rheostat drive motor again to make a further adjustment, in the proper sense, in the current flowing in the magnetic clutch. Due to the inherent relatively long period of time necessary for the heat exchanger or radiator 3 to function to restore its outlet water temperature to the required value, there is substantially no possibility of the apparatus as just described operating too long so that the desired end condition is exceeded. In other words, the operation of the heaters and their associated bimetal strips is inherently matched to and slightly faster than the cooling effect and time lag of the radiator and fan, so that, as a practical matter, the system will not overadjust with resultant hunting or oscillation of the water temperature about the desired value.

In practical operation of the system, it has been found that it is often desirable to provide means for speeding up the operation of the rheostat drive motor 13, particularly when the engine temperature has reached a high level due to continued heavy loading of the engine, or in the case when the engine is first started up after standing idle. By accelerating the rheostat drive motor 13 in a direction to cause it to rapidly decrease the resistance value of rheostat 12, the radiator cooling fan is thereby accelerated and increased cooling effect supplied to the engine. This is accomplished by arranging the mounting of the bimetallic strip 29 so that it is pivoted at its lower end, by means of the bracket 42 and the pin 42', to the fixed support 43 which may form a portion of the case of the temperature responsive device 17. The support 43 also includes a lower extending portion 44 which acts as a second stop or pivot and is normally maintained in engagement with the stiff spring 45 which is secured to the bimetallic strip 29. The adjustable tension spring 46 maintains the parts in the relationship as shown in Fig. 1. Secured to the underside of the support 44 I have provided a small snap-acting, normally closed switch 47 which is preferably of the type requiring very small travel of its operating pin 48 for operation of the switch contacts. The normally closed switch 47 is placed in parallel, by means of the conductors 49, with a portion of the resistor 50 which is in shunt relationship with the rheostat drive motor armature 13. By this arrangement, the opening of the switch 47 inserts additional resistance in the motor armature shunt circuit, thereby diverting a greater portion of line current through the armature itself and resulting in higher speed operation of the rheostat drive motor.

For example, if the water temperature in the engine cooling system has risen rapidly to a high value due to engine loading, as previously mentioned, the bellows 18 will be in the expanded condition with the lever 21 rotated its extreme amount in a clockwise direction. The circuit of the rheostat drive motor will then be closed through the contacts 24 and 25 with the result that the heater 27 will be energized, and also the field winding 15 of the rheostat drive motor will be energized so that the drive motor will be slowly adjusting the resistance 12 in a direction to increase current in the magnetic clutch and effect speed up in the radiator cooling fan 4. If the normal rate of operation of the system is not sufficient to quickly reduce the engine temperature, the continued application of heat to the bimetal 29 will cause the bimetal to exert greater and greater pressure against the upper lever arm 31 tending to rotate it in a counterclockwise direction. Since the water temperature is still above required value, the lever will be held in the extreme right-hand position by the bellows 18 and the force exerted by the bimetal will result in its being flexed to a configuration very slightly semi-circular, which when acting around the pivot 42' will result in the lower end of the spring strip 45 being slightly away from the snap-acting switch 47, this travel being sufficient to release the operating pin 48 and open the contacts of the switch 47. Thus, additional resistance is inserted in shunt with the rheostat drive motor with a resulting acceleration of the motor and increased rate of acceleration of the radiator cooling fan. It is not considered necessary to apply a similar arrangement to the bimetallic strip 30 since the possibility of damage to the engine by delayed operation of the temperature adjusting system at low water temperatures is not present as in the case of excessive engine temperatures.

Fig. 2 shows a modification of the system previously described in connection with Fig. 1 and which relates particularly to the method of driving the radiator cooling fan and the circuit arrangement for varying the speed of the radiator cooling fan 4. Thus, in Fig. 2, with the exception of the drive means for the radiator fan, the system is identical to that of Fig. 1. In Fig. 2, the rheostat 12 is arranged to have its rotary contact 12' operated by the rheostat drive motor as in Fig. 1; however, instead of varying the current supplied to the electromagnetic clutch, the current varied is supplied to field winding 51 of the direct current motor 52 which is directly connected to the radiator fan 4 and is operated from direct current supplied to its armature 53, as shown in Fig. 2. The system of Fig. 2 may be advantageous in many cases where the location of the radiator is not in proximity with the engine so that the direct drive and clutch arrangement is inconvenient, or where, for other reasons, it is desirable to have the radiator fan capable of operation with the engine in a shut-down condition. Thus, in Fig. 2 the operation of the temperature control system is the same as in Fig. 1 and operation of the rheostat drive motor in response to an indication of the temperature sensitive device for increased cooling will result in an increase of resistance being supplied to the motor field circuit 51 by the rheostat 12 which will, in turn, result in a reduction in field exciting current and consequent acceleration of the fan drive motor 52. In case that reduced cooling effect is called for by the temperature sensitive device, the opposite action takes place and field current in field winding 51 is increased, resulting in a deceleration of the radiator cooling fan 4.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. An electric circuit controlling device for maintaining a temperature condition relatively constant comprising, lever means movable between two stop positions, temperature adjusting apparatus energized in one position of said lever to increase temperature and energized in the other position of said lever to decrease temperature, means responsive to said temperature condition for actuating said lever, and time delayed auxiliary lever actuating means opposing said temperature responsive lever actuating means, said auxiliary lever actuating means including a bimetallic element and heater therefor and said heater being in series circuit relationship with said temperature adjusting apparatus.

2. An electric circuit controlling device for maintaining a temperature condition relatively constant comprising, a lever movable between two stop positions, temperature adjusting apparatus energized in one position of said lever to increase temperature and energized in the other position of said lever to decrease temperature, means responsive to said temperature condition for actuating said lever, and time delayed auxiliary lever actuating means opposing said temperature responsive lever actuating means, said auxiliary lever actuating means including a pair of oppositely acting bimetallic elements and heaters therefor and one of said heaters being energized simultaneously with said temperature adjusting apparatus in one position of said lever, and means effective upon a continued condition of high temperature to accelerate the temperature decreasing action of said temperature adjusting apparatus.

3. An electric circuit controlling device for maintaining the temperature of a fluid relatively constant comprising, a lever movable between two electric circuit closing positions, reversible control means connected to operate in one direction upon movement of said lever to one circuit closing position and to operate in the reverse direction upon movement of said lever to the other circuit closing position, fluid temperature adjusting apparatus regulated by said control means, means responsive to said fluid temperature for actuating said lever, time delayed auxiliary lever actuating means opposing said temperature responsive lever actuating means, said auxiliary lever actuating means including a pair of oppositely acting bimetallic elements and heaters therefor and one of said heaters being energized simultaneously with said reversible control apparatus, and means cooperating with one of said bimetallic elements and responsive to continued heating of said element to accelerate the temperature decreasing action of said reversible control means.

4. An electric circuit controlling device for maintaining the temperature of a fluid relatively constant comprising, a lever movable from a mid-position to either of two electric circuit positions, reversible control means connected to operate in one direction upon movement of said lever to one circuit closing position and to operate in the reverse direction upon movement of said lever to the other circuit closing position, fluid temperature adjusting apparatus regulated by said control means, means responsive to said fluid temperature for actuating said lever, auxiliary lever actuating means opposing said temperature responsive lever actuating means, said auxiliary lever actuating means including a pair of oppositely acting bimetallic elements, and an electric heater for each of said bimetallic elements, one of said heaters being energized by movement of said lever to one of said circuit closing positions and effective to apply force to said lever in a sense to return said lever to its mid-position.

EARNEST F. WEISER.

REFERENCES CITED

The following references are of record in the file of this patent:

UNITED STATES PATENTS

| Number | Name | Date |
|---|---|---|
| 1,304,100 | Roesch | May 20, 1919 |
| 1,903,459 | Johnsson | Apr. 11, 1933 |
| 1,912,154 | Morrison | May 30, 1933 |
| 1,926,706 | Eggleston | Sept. 12, 1933 |
| 2,079,497 | Wilhjelm | May 4, 1937 |
| 2,104,972 | Cunningham | Jan. 11, 1938 |
| 2,382,073 | Lehane et al. | Aug. 14, 1945 |
| 2,396,000 | Findley | Mar. 5, 1946 |
| 2,466,865 | Puster | Apr. 12, 1949 |

FOREIGN PATENTS

| Number | Country | Date |
|---|---|---|
| 444,673 | Great Britain | Mar. 25, 1936 |
| 541,830 | Great Britain | Dec. 12, 1941 |